June 21, 1932.  L. BLACKMORE  1,863,825
BOOSTER BRAKE
Filed Feb. 14, 1923   2 Sheets-Sheet 1
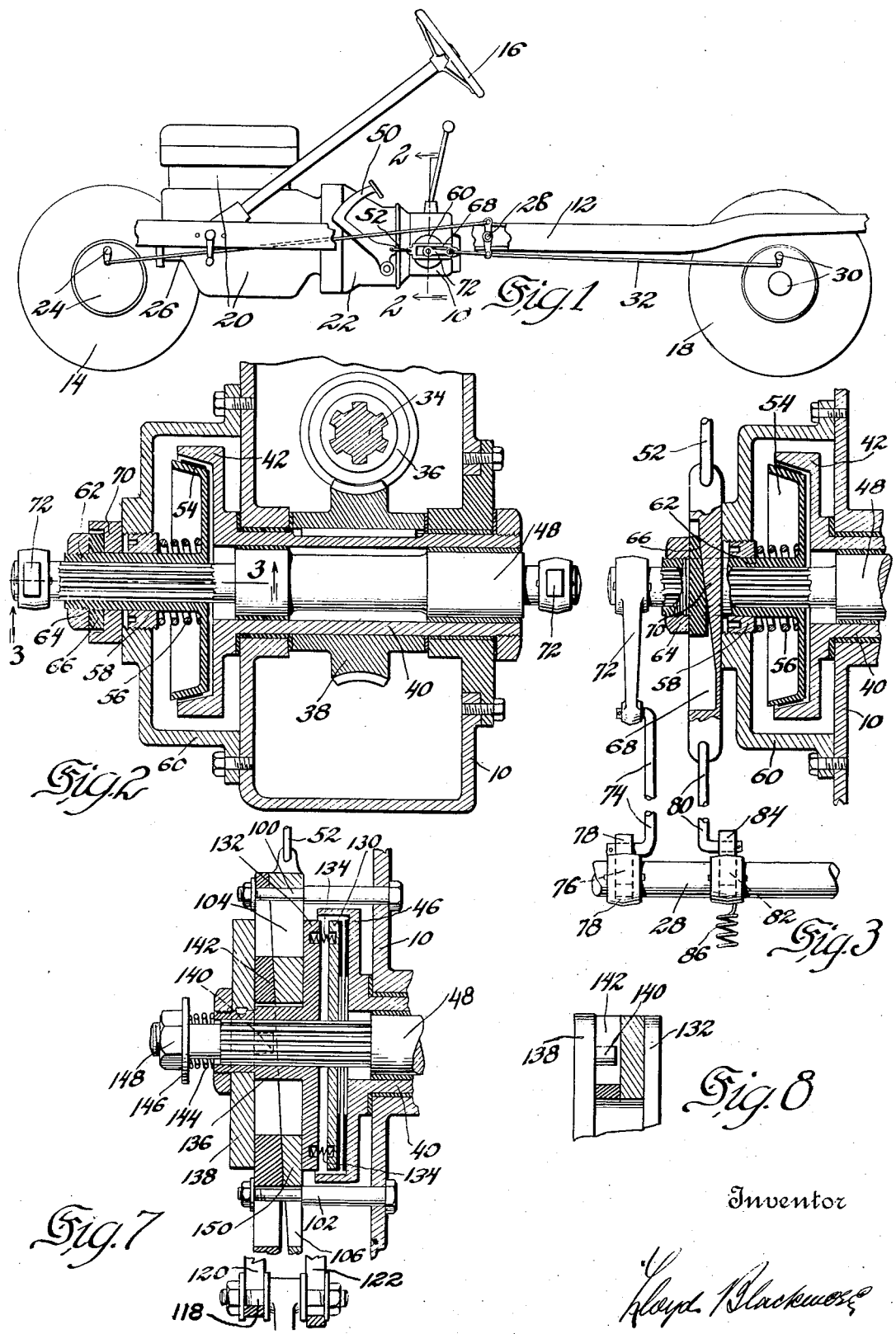

June 21, 1932.  L. BLACKMORE  1,863,825
BOOSTER BRAKE
Filed Feb. 14, 1923   2 Sheets-Sheet 2
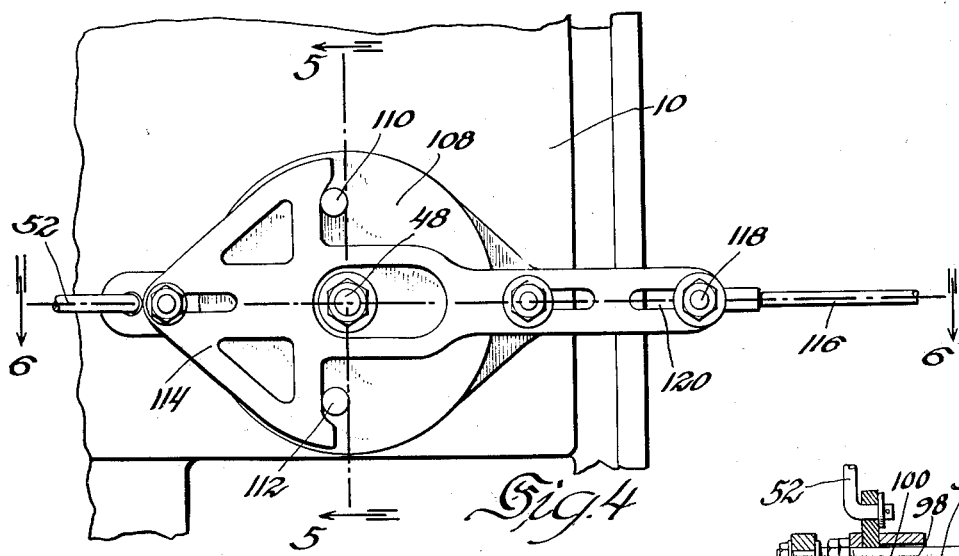
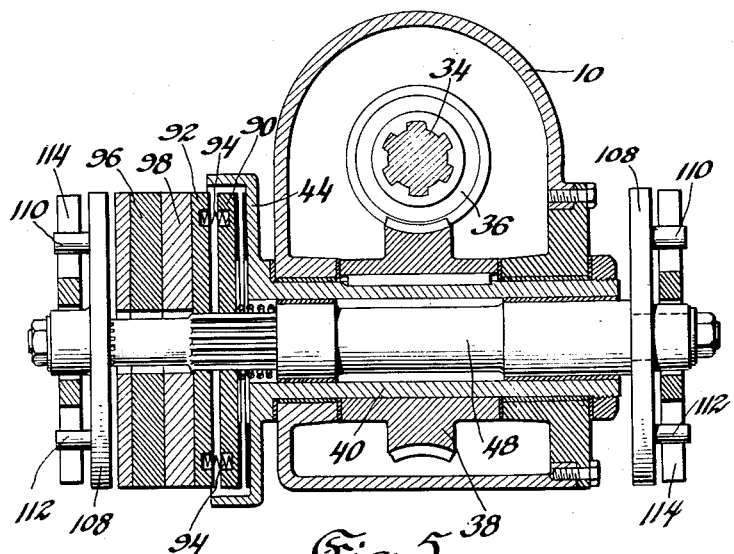
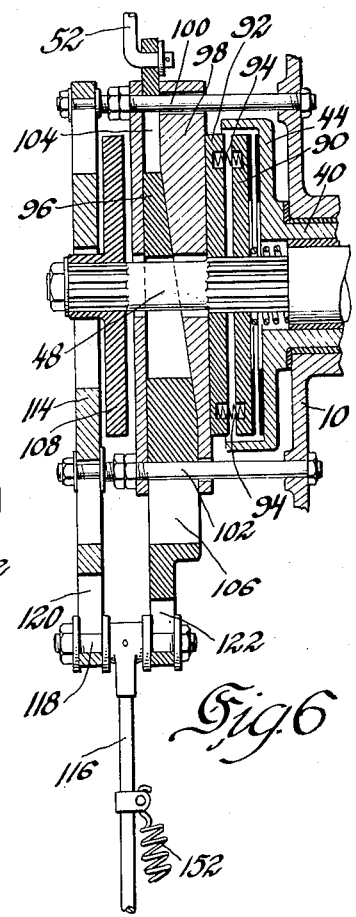
Inventor
Lloyd Blackmore Patented June 21, 1932

1,863,825

UNITED STATES PATENT OFFICE

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE

BOOSTER BRAKE

Application filed February 14, 1923. Serial No. 618,941.

This invention relates to brakes, and is illustrated as embodied in an automobile having brakes which can be operated manually or in which power, from the transmission shaft or other power driven part, can be used to operate the brakes or to aid the driver in manually applying the brakes. Brakes in which power is used in this manner are commonly known as "booster" or "servo" brakes.

An important object of the invention is to meet one of the objections to existing booster brakes, to the effect that they are only capable of power operation when the vehicle is moving forward, by providing for the use of power whether the vehicle is moving forward or backward. This is accomplished by including in the power-operated brake-setting connections a novel device which is effective in the same sense no matter which way the vehicle is moving, or the transmission shaft or other power-driven part is turning. In one embodiment of this feature of the invention, preferred for the cheaper types of cars, this device comprises an arm which is arranged to exert a pull on a brake-operating link no matter which way it is turned. In an alternative illustrative embodiment of this feature of the invention a brake-operating yoke has arms opposite a pair of pins on a power-operated member which is so arranged that one of the pins operates the yoke when the member turns clockwise and the other one operates the yoke when the member turns counter-clockwise.

The invention also contemplates eliminating interference between manual and power operation, and improving the usual arrangement by which the brakes are set manually through the power connections, by providing direct manually-operable connections, lost motion devices preferably being arranged so that the auxiliary connections do not interfere with power operation and the power means does not resist manual operation.

In order to adapt my improvements for use in different kinds of cars, I have designed a number of desirable constructions of power-transmitting mechanism of different types, each embodying in itself substantial novelty, and each offering by reason of its novel construction important advantages. For convenience of description, these features of novelty, and the advantages derived therefrom, are explained below in describing an illustrative embodiment of each of three types of such power mechanism having certain broad features of novelty in common as well as important subordinate features peculiar to each type.

In addition to the features discussed above, and the features explained below in describing the several modified forms, the invention comprises numerous novel combinations and desirable particular arrangements and constructions of parts which will be apparent from the following description of the three illustrative embodiments shown in the accompanying drawings, in which:

Figure 1 is a diagrammatic view, partly in side elevation and partly in longitudinal vertical section, of an automobile embodying one form of booster brake;

Figure 2 is a section on the line 2—2, Figure 1, transversely through the transmission in a vertical plane, showing the power-transmitting parts in section;

Figure 3 is a section generally on the line 3—3, Figure 2, showing the parts in horizontal section;

Figure 4 is a side elevation, corresponding to part of Figure 1, of part of the transmission, showing a modified form of the invention selected as an illustrative embodiment of a different type of booster mechanism;

Figure 5 is a section on the line 5—5 of Figure 4, showing the parts in transverse vertical section;

Figure 6 is a section on the line 6—6 of Figure 4, showing the parts in transverse horizontal sections;

Figure 7 is a sectional view, corresponding to Figure 6, showing a modified form of the invention selected to illustrate a third type of booster mechanism; and Figure 8 is a view in vertical section, corresponding to part of Figure 5, but showing parts of the booster mechanism of Figure 7.

While not necessarily limited to such use, the booster mechanism of my invention is especially well adapted for operation by the transmission 10 of an automobile 12 having dirigible front wheels 14 controlled by a steering wheel 16, and rear wheels 18 driven in the usual manner by the transmission. The transmission is connected to an engine 20 through a main clutch 22, being driven by the engine when the main clutch is in and, when the main clutch is out, remaining at rest if the car is not moving or if the car is moving, being driven by power derived from the momentum of the car transmitted through the rear wheels 18. Under ordinary circumstances, when the brakes are applied the main clutch is out, the car being at rest or moving forward or backward under the power of its momentum.

The car may be provided with any desired number of brakes, but the amount of power made available by the booster mechanism is especially useful in operating a set of four-wheel brakes including front wheel brakes 24 connected by links 26 to arms on a shaft 28, and rear wheel brakes 30 preferably connected by links 32 to arms on the same shaft 28. The brakes may be of any desired type.

In all three of the illustrated forms, a power-driven shaft 34, forming part of the transmission, is provided with a worm 36 driving a worm wheel 38 keyed to a sleeve 40 carrying a driving clutch member 42 (Figs. 2 and 3) or 44 (Figs. 5 and 6) or 46 (Fig. 7). A shaft 48, passing through sleeve 40 and rotatable with respect thereto, is connected as described below to shaft 28 to operate the brakes. In each form, also, the brakes are controlled by a manually-operable member such as a brake pedal 50, within easy reach of a driver holding the steering wheel 16, by a link 52.

In the modification shown in Figures 1, 2, and 3, the clutch member 42 is the outer part of a friction cone clutch, the inner part being a cooperating clutch member 54 splined on the reduced outer end of shaft 48, and urged in a direction to throw the clutch in by a spring 56 engaging a bushing 58 threaded in a casing 60 secured to the transmission casing, in such a manner that the bushing may be turned by a spanner wrench to adjust the tension of the spring. Clutch member 54 is formed with a sleeve 62 passing through the bushing and carrying a nut 64 engaged by a wedge 66 loosely mounted on the sleeve and seated in a channel 68 in a wedge 70 connected to the pedal-operated link 52. The wedges are shown most clearly in Figure 3, which is a section generally on the line 3—3 of Figure 2, except that in passing through the wedges the view is taken in a plane just above sleeve 62. Wedge 70 is formed with a slot seated over sleeve 62, so that the wedge moves longitudinally when pedal 50 is operated.

Shaft 48, which is rocked by angular movement of clutch member 54, is provided with a pair of arms 72 attached to links 74, the ends of which hook through slots 76 in the lower ends of arms 78 secured to and extending downwardly from the brake operating shaft 28. The wedge 70 is also connected directly to shaft 28 by a link 80, the end of which hooks through a slot 82 in the lower end of an arm 84 which is also secured to and which extends downwardly from shaft 28.

The above described parts are normally in the positions shown in Figures 2 and 3, with clutch members 42 and 54 disengaged, with the brakes off, and with clutch member 42 rotating by reason of its being geared to shaft 34. If the driver then depresses pedal 50, wedge 70 is withdrawn, spring 56 engages clutch members 42 and 54, and the resultant turning of member 54 rocks shaft 48. Whichever direction shaft 48 turns (i. e., whether the shaft 34 is turning clockwise in Figure 2 by reason of the car moving backward or counter-clockwise by reason of the car moving forward), arms 72 exert a pull on arms 78 through links 74, rocking shaft 28 to set the brakes. Pedal 50 also exerts a pull directly on arm 84 through link 80, also tending to rock shaft 28 to set the brakes. When the pedal is released a suitable return spring 86 returns the parts to their original positions, wedge 70 operating to disengage clutch members 42 and 54.

In this modification, it will be noted that manual operation of the brakes, through link 80 or in any equivalent manner, withdraws a clutch-controlling device such as the above-described wedge 70, to permit a spring to throw the clutch in. By this arrangement, the power applied by the clutch is wholly independent of the extent of manual operation, depending only on the tension of the spring and the speed of movement of shaft 34, and therefore the driver retains the "feel" of the brakes through the pedal or other controlling member, the booster mechanism merely helping him by an amount which is the same whether he applies a very small amount of manual power to the brakes or whether he jams the brakes on with all his force. At the same time the power applied by the booster mechanism is a function of the speed of shaft 34, since the friction between the slipping clutch members is greater at high than at low speeds, and therefore the booster mechanism applies more power to the brakes when the car is moving rapidly than when it is moving slowly. That is to say, the booster mechanism helps in applying the brakes by an amount which is a function of the momentum and speed of the car.

The clutch spring may be adjusted, e. g., by turning bushing 58, to change the friction in the clutch and cause the clutch to deliver more power, as for example in adjusting the brakes for operation by a woman driver, or less power to cause the brakes to offer greater resistance to the rough usage of some men drivers who like to feel something to push vigorously against when they apply the brakes.

Slots 76 and 82 provide lost-motion connections so that the clutch does not resist manual operation of the brakes if shaft 34 is at rest, and on the other hand the manual connections do not interfere with power operation if the driver merely depresses pedal 50 far enough to throw the clutch in, without adding any manual pressure on the brakes.

In the modification shown in Figures 4, 5 and 6, clutch member 44 forms one part of a slipping friction disk clutch, the other part of which consists of two disks 90 and 92 splined on the reduced end of shaft 48 and separated axially by springs 94. The clutch is operated by a wedge 96 cooperating with a wedge 98 slidably mounted on fixed guide rods 100 and 102 which also pass through slots 104 and 106 in wedge 96. Wedge 96 is connected by link 52 to the brake pedal.

When clutch members 90 and 92 rock shaft 48, the shaft in turn rocks a disk 108 splined thereon, to turn one or the other of two pins 110 and 112 in a direction to operate a yoke 114 slidably supported on guide rods 100 and 102 and on the hub of disk 108. The yoke is connected to the brakes by a link 116, which is also connected to wedge 96, the link having a pin 118 at its end, opposite ends of which are held respectively in a slot 120 in yoke 114 and a slot 122 in wedge 96, to provide lost motion connections so that manual and power operation do not interfere with one another.

In the illustrated arrangement, a second disk 108 and yoke 114 are mounted on the opposite end of shaft 48.

It will be observed that in this modification, which is suitable for use in heavy vehicles, the clutch is thrown in, not by a spring having a uniform action, but by direct connections from the brake pedal or other controlling member, illustrated as comprising wedge 96, so that the harder the driver pushes on the pedal the more the friction in the clutch 44—90—92 is increased by greater compression of springs 94, and the more power is applied to the brakes. In this, as in the first modification, there is ordinarily concurrent manual and power operation of the brakes, so that the driver gets the "feel" of the brakes when he applies them. Pins 110 and 112 and the opposite arms of yoke 114 provide opposed lost-motion devices, one of which operates the brakes when the shaft 34 turns clockwise and the other of which operates them when the shaft turns counter-clockwise.

In the third modification, one illustrative embodiment of which is shown in Figures 7 and 8, the brakes are applied manually only when shaft 34 is not rotating or when it is rotating too slowly to supply power enough to overcome the resistance of the brakes. At other times the brakes are applied by manually-controlled power derived from clutch member 46, geared to shaft 34, by manipulation of cooperating clutch disks 130 and 132, splined on shaft 48 and separated by springs 134. Disk 132 is formed with a hub sleeve 136, to which is secured a disk 138, corresponding to disk 108, except that its two opposite pins 140 are turned inwardly as shown in Figure 8. One or the other of pins 140, when clutch disks 130 and 132 turn shaft 48, engages one of the opposite arms of a yoke 142, appearing the same in side elevation as yoke 114 shown in Figure 4.

In this embodiment of the invention, a spring 144, engaging a washer 146 held by a nut 148 on the end of shaft 48, urges disk 138, yoke 142, and clutch disks 132 and 130 to the right in Figure 7 to throw the clutch in and cause shaft 48 to turn to move yoke 142 to operate the brakes. This action is normally prevented by a wedge 150 seated against shoulders on guide pins 100 and 102, and sloping in the reverse direction from wedge 96 and in the same direction as wedge 70, and which is connected to link 52 to be withdrawn by the brake pedal 50 or other manually-operated controlling member. When wedge 150 is withdrawn, therefore, spring 144 throws the clutch in, and to this extent the operation is like that of the first modification.

However, there is provided in this form a second wedge, connected to and moving with yoke 142, to climb up wedge 150 and release the clutch as soon as the yoke has travelled such a distance as to operate the brakes in an amount proportional to the amount of movement of pedal 50. As a convenient arrangement of such a wedge, having obvious advantages from a manufacturing point of view, this second wedge is shown as being integral with yoke 142, being in fact formed directly on the back of the yoke as clearly shown in Figure 7. This wedge slopes in the opposite direction from wedge 150.

In the operation of this embodiment of one type of any improved booster mechanism, depression of pedal 50, say one-fourth its maximum throw, withdraws wedge 150 a certain distance, for example one-half inch (the exact distance necessary depending on the slope of the wedge). This permits spring 144 to engage disk 130 with clutch member 46, causing shaft 48 to be rocked in one direction or the other. Spring 144 is strong enough so that this clutching action of the disks is very nearly positive. The rocking of the shaft 48 rocks disk 138, causing one or the other of the pins 140 to engage yoke 142, which is moved thereby to operate the brakes.

Movement of the yoke, however, causes the wedge on its back face to climb up on wedge 150, and immediately begins to release the clutch. If the yoke were to be moved a distance exactly equal to the travel of wedge 150, obviously the clutch would be thrown entirely out. The resistance of the brakes prevents this, in practice, as the movement of the yoke stops when the clutch has been released to such an extent that its friction exactly equalizes the pull from the brakes, so that the brakes are held in that position. Practically, the yoke moves substantially the same distance as wedge 150, and its travel will, for convenience, be thus defined in some of the appended claims.

If now the pedal be released, a return spring (not shown), corresponding to spring 152 in Figure 6, will operate wedge 150 and yoke 142 to throw out the clutch completely and then to return all the parts to their initial positions. If on the contrary the pedal be further depressed, wedge 150 will be withdrawn a corresponding further distance, and yoke 142 will follow it until the clutch is released sufficiently just to hold the brakes in their new positions. Thus the extent of operation of the brakes depends solely on the position of the brake pedal, and in no degree on the strength of spring 144 or the angular speed of shaft 34, and in this respect the method of operation differs from the method of operation of the first modification.

When shaft 34 is not turning, or is turning too slowly to supply enough power for the brakes, it is desirable that manipulation of the brake pedal should set the brakes by manual power. To this end, yoke 142 and wedge 150 are formed with slots 120 and 122 the same as in Figure 6, the slots embracing pin 118 except that slot 122 is slightly longer than the corresponding slot shown in Figure 6 to permit the above described slight lag of the yoke. Then if shaft 34 is not turning, movement of wedge 150 operates link 116 directly.

It will be observed that in this modification, which is desirable when ease of operation is a primary consideration, the brakes, while capable of manual operation when the car is not running, are ordinarily applied entirely by driver-controlled power by what may be called a "throttle" or "relay" action; i. e., the brake pedal or other controlling member merely controls the application of the power. It is also to be noted that the brakes operate the same as if applied manually,—if the pedal is depressed halfway and held there, the brake cams or equivalent devices are turned through one-half their maximum arc of movement and then held there and soon this operation following manipulation of the pedal with no appreciable lag.

It should also be noted that in all the modifications the clutch as it slips has a substantial retarding action on shaft 34 and therefore on the vehicle, and thus constitutes practically a transmission brake.

Where the term "clutch" is used in the appended claims, unless specifically defined otherwise, it is my intention that it be construed as covering any controllably power-transmitting device, and similarly it is my intention that the term "brake" be construed broadly to cover any retarding means, as it is not my intention to limit the invention to use with clutches or brakes of the particular types illustrated.

I desire, in short, that my invention be regarded as limited only by the terms used in the appended claims, and that these terms be given their full customary scope where not specifically limited, inasmuch as many modifications and variations within the spirit of my invention will be found possible and desirable in adapting it to particular vehicles and in adapting its various novel features for other uses than in automobiles.

I claim:

1. A self-propelled vehicle having, in combination, a brake, a power-driven shaft, a driver-operated controlling member, and means operated by said member for applying the brake manually or by power derived from said shaft when it is turning in either direction.

2. A self-propelled vehicle having, in combination, a brake, power-operated connections for applying the brake, auxiliary manually-operated connections for applying the brake, and a common driver-operated controlling member for all of said connections, there being lost motion devices in said connections so that the power and manual connections do not interfere with one another.

3. A self-propelled vehicle having, in combination, a brake, a power-driven shaft, a device manually movable to connect the brake to the shaft to set it by power, and connections direct from said device to the brake to set it manually, there being lost motion devices arranged so that manual and power setting of the brake do not interfere with each other.

4. A self-propelled vehicle having, in combination, a brake, a power-driven shaft, connections for operating the brake, a clutch to connect said connections to the shaft to be operated thereby, a driver-operated member controlling the clutch, and auxiliary connections from said member for manually operating the brake constructed and arranged to operate without resistance from the clutch when the shaft is not running.

5. A self-propelled vehicle having, in combination, a brake, a power-driven shaft, connections with the brake for operating the brake, a clutch to connect said connections to the shaft to be operated thereby, a driver-operated member controlling the clutch, and auxiliary connections including a lost motion device between said member and the brake for applying the brake manually when the shaft is not running.

6. A vehicle having, in combination, a brake, connections with the brake for operating the brake, a power-driven shaft, a clutch for connecting and disconnecting the connections from said shaft and rotatable in both directions with said shaft, a manually shiftable clutch controlling member, said connections operating the brake in the same sense when the clutch is in, whichever way the shaft is turning, and means for setting the brake manually when the shaft is not running.

7. A vehicle having, in combination, a brake, connections for operating the brake, a power-driven shaft, a clutch for connecting and disconnecting the connections from said shaft, a manually shiftable clutch-controlling member, said connections being arranged to operate in the same sense when the clutch is in, whichever way the shaft is turning, and auxiliary connections from said member for manually setting the brake, there being a lost motion device arranged so that the clutch does not resist manual operation of the brake.

8. A self-propelled vehicle having, in combination, a brake, a power-driven clutch member, brake-operating connections including a cooperating clutch member, a driver-operated controlling member, a device operated by the controlling member to engage and disengage the clutch members, and auxiliary connections direct from said device for operating the brake manually.

9. A self-propelled vehicle having, in combination, a brake, a power-driven clutch member, brake-operating connections including a cooperating clutch member, a driver-operated controlling member for wedging the clutch members axially to engage and disengage them, and auxiliary connections for operating the brake manually.

10. A self-propelled vehicle having, in combination, a transmission including a power-driven shaft, a clutch member geared to the shaft, a brake, a driver-operated controlling member, a cooperating clutch member and lost motion connections therefrom to the brake, a device shifted by the controlling member to engage and disengage the clutch members, and auxiliary connections operated by the controlling member for applying the brake manually.

11. A self-propelled vehicle having, in combination, a transmission including a power-driven shaft, a clutch member geared to the shaft, a brake, a driver-operated controlling member, a cooperating clutch member connected to the brake, a device shifted by the controlling member to engage and disengage the clutch members, and auxiliary connections including a lost motion device, between the controlling member and brake for applying the brake manually.

12. A self-propelled vehicle having, in combination, a brake, a power-driven shaft turning in opposite directions when the vehicle moves forward and backward, common means for operating the brake from the shaft both when the vehicle is moving forward and when moving backwards, and auxiliary means for operating the brake manually.

13. A vehicle having, in combination, a brake, a transmission and a casing therefor, a brake pedal, and brake-operating connections from the pedal to the brake including a member slidably mounted on said casing.

14. A vehicle having, in combination, a brake, a power-driven clutch, a driver-controlled wedge shiftable to operate the clutch, connections from the clutch for operating the brake, and auxiliary connections from the wedge for operating the brake.

15. A vehicle having, in combination, a brake, a power-driven shaft, a driver-controlled clutch for the shaft, and opposed lost motion devices connected to the brake, one of said devices being operated by the shaft when it turns clockwise and the other being operated when the shaft turns counter-clockwise.

16. A vehicle having, in combination, a brake, a power-driven shaft, a clutch therefor, brake-operating connections, common driver-controlled means for operating said connections and the clutch, and a pair of lost motion devices operated by the clutch, one of which aids in operating said connections when the shaft is turning clockwise and the other of which aids in operating said connections when the shaft is turning counter-clockwise.

17. A vehicle having, in combination, a brake, a power-driven shaft, a driver-controlled clutch therefor, diametrically opposed pins turned in one direction or the other by the shaft when the clutch is in, and a brake-operating yoke having opposite arms, one of which is engaged and moved by one of the pins when the shaft is turning clockwise and the other of which is engaged and moved by the other pin when the shaft is turning counter-clockwise.

18. A device of the class described comprising, in combination, a power-driven clutch member, a relatively-movable cooperating clutch member, a disk having diametrically opposite projections, the disk being connected to the second clutch member to turn therewith, and a slidably mounted yoke having opposite arms in positions to be engaged by the projections, the yoke and projections being arranged to constitute opposed lost-motion devices, the one projection imparting rectilinear movement to the yoke when the clutch members turn clockwise and the other projection imparting rectilinear movement to the yoke when the clutch members turn counter-clockwise.

19. A device of the class described comprising, in combination, a power-driven clutch member, a relatively movable cooperating clutch member, a pair of cooperating wedges, one of which is manually movable to wedge the clutch members together and apart, a disk having diametrically opposite projections, the disk being connected to the second clutch member to turn therewith, and a slidably-mounted yoke having opposite arms in positions to be engaged by the projections, the yoke and projections being arranged to constitute opposed lost-motion devices, the one projection imparting rectilinear movement to the yoke when the clutch members turn clockwise and the other projection imparting rectilinear movement to the yoke when the clutch members turn counter-clockwise, in which the wedge which cooperates with the manually movable wedge is connected to and moves with the yoke in a manner to separate the clutch members automatically when the yoke travels a distance determined by the movement of the manually movable wedge.

20. A device of the class described having, in combination, a power-driven clutch member, a relatively movable cooperating clutch member, a device moved by turning movement of the second clutch member, a spring to force the clutch members together, and a pair of wedges for separating the clutch members, one of the wedges being manually shiftable to allow the spring to operate, and the other wedge being connected to and moving with said device in a manner to separate the clutch members automatically when the device has traveled a distance determined by the movement of the manually shiftable wedge.

21. A vehicle transmission having, in combination, a power-driven shaft, a clutch member geared thereto, a cooperating relatively movable clutch member, a spring urging the clutch members together, a brake-operating slide arranged to be moved by the second clutch member, a wedge arranged to be withdrawn manually to allow the spring to throw the clutch in, and a cooperating reversed wedge connected to and moving with the slide to climb upon the first wedge in a manner to relieve the clutch members when the slide has traveled a distance determined by the extent of movement of the first wedge.

22. A vehicle transmission having, in combination, a power-driven shaft rotatable in either direction, a clutch member geared thereto, a cooperating relatively movable clutch member, a spring urging the clutch members together, a brake-operating slide arranged to be moved by the second clutch member in the same direction whichever way the shaft is turning, a wedge arranged to be withdrawn manually to allow the spring to throw the clutch in, and a cooperating reversed wedge connected to and moving with the slide to climb up on the first wedge in a manner to relieve the clutch members when the slide has traveled a distance determined by the extent of movement of the first wedge.

23. A vehicle having, in combination, a brake, a power-driven clutch member, a relatively movable cooperating clutch member, a spring urging the clutch members together, a device moved by the second clutch member to set the brake, a driver-controlled wedge arranged to be withdrawn to permit the spring to bring the clutch members together, and a part moving with the brake setting device to climb up on the withdrawn wedge as the device moves and automatically release the clutch members.

24. A vehicle having, in combination, a brake, a power-driven clutch, connections from the clutch for setting the brake, a manually-movable member for throwing the clutch in, and a part moving proportionally to the setting of the brake to release the clutch.

25. A vehicle having, in combination, a brake, a clutch, connections from the clutch for operating the brake, a manually movable member for throwing the clutch in, and means for releasing the clutch when the brake has been operated in an amount proportional to the movement of said member.

26. A vehicle having, in combination, a brake, a clutch, connections from the clutch for setting the brake, a manually movable member for throwing the clutch in, and automatic means for tending to release the clutch when the brake has been set.

27. A vehicle having, in combination, a brake, a manually-movable brake-controlling member, and rotatable mechanically-driven means controlled by said member for setting the brake in a degree determined by the extent of movement of said member and then automatically relieving the setting force to hold it so set without additional setting action until further movement of said member.

28. A vehicle having, in combination, a brake, a manually-movable controlling member, rotatable mechanically driven means for setting the brake and means for automatically limiting the degree of setting of the brake according to the position of said member.

29. A vehicle having, in combination, a brake, a manually-movable controlling member, and rotatable mechanically driven means for setting the brake by power in a manner and degree as if the brake was manually operated by connections directly from said member.

30. A vehicle having, in combination, a brake, a power-driven shaft, a friction clutch and connections for connecting the shaft to the brake, auxiliary connections for operating the brake, a manually-movable controlling member connected to the auxiliary connections, and means operated by the controlling member for progressively increasing the friction of the clutch for applying power to the brake as the auxiliary connections are manually operated by the controlling member.

31. A vehicle having, in combination, a brake, a power-driven shaft, a driver-controlled friction clutch for connecting the shaft to the brake, auxiliary connections for manually operating the brake and simultaneously and progressively varying the friction in the clutch, and power connections from the clutch to the brake including opposed lost motion devices, one of which is operatively connected to the brake when the shaft turns clockwise, and the other of which is operatively connected to the brake when the shaft turns counter-clockwise.

32. A vehicle having, in combination, a brake, a power-driven friction clutch, a manually-movable member for operating and for progressively increasing the friction in the clutch, and brake-operating connections including a pair of lost-motion devices one of which is operative to set the brake when the clutch turns clockwise and the other of which is operative to set the brake when the clutch turns counter-clockwise.

33. A vehicle transmission comprising, in combination, a power-driven shaft, a clutch member geared thereto, a cooperating brake-operating clutch member, a spring for urging the clutch members together, a manually-movable brake-operating device, a member withdrawn by said device to allow the spring to cause the clutch members to engage, and means for adjusting the tension of the spring.

34. In combination, a brake, means to actuate said brake, a manually operable member, a connection between said member and means, servo-mechanism, movable means actuated by a movement of said connection to render said servo-mechanism operative, and a second connection between said servo-mechanism and the brake actuating means.

35. The invention defined by claim 34, together with a lost motion mechanism between each of said connections and the brake actuating means.

36. In combination, a brake, means to actuate said brake, a manually operable member, a connection between said member and means, a servo-mechanism having a part rotatable in opposite directions, movable means actuated by a movement of said connection to render said servo-mechanism operable, and a second connection between said servo-member and said brake actuating means operable to operate said brake actuating means in one direction upon a rotation of said servo-mechanism in either direction.

37. A motor vehicle, a transmission therefor comprising, in combination, a power-driven shaft, a clutch member geared thereto, a cooperating brake-operating clutch member, a spring for urging said members together, a brake-controlling device, and a member arranged to be withdrawn manually by said device to allow the spring to cause the clutch members to engage.

38. A motor vehicle having, in combination, driven wheels, a power driven shaft for rotating said wheels, a brake, a clutch member in driven relation with said shaft, a co-operating clutch member connected to the brake, a spring urging said clutch members together, a manually operable device movable to allow the spring to cause engagement of said clutch members and means to adjust the tension of said spring.

39. In a motor vehicle, driven wheels, a motor driven shaft for driving said wheels, a brake, a clutch comprising cooperating members one driven by said shaft, a spring for effecting the engagement of said clutch members, means for adjusting the tension of said spring, connections from said clutch to said brake, a device for holding the clutch members out of engagement, and manually operable connections for withdrawing said device and allowing the spring to throw the clutch members into engagement.

40. A vehicle having, in combination, a brake, a power-transmitting clutch, a spring for throwing the clutch in, connections for operating the brake by power when the clutch is in, a device for holding the clutch out, and manually operable connections for withdrawing said device to allow the clutch to be thrown in and for additionally transmitting manual force for operating the brake.

41. A vehicle having, in combination, a brake, a friction clutch for operating the brake by power, a spring arranged to render the clutch operative, and manually-controlled mechanism movable to apply manual force to the brake and to allow the spring to render the clutch operative, when moved in one direction, and to release the brake and throw out the clutch when moved in the other direction.

42. A vehicle having, in combination, power driven means, manually operable means, a brake, connections between said brake and each of said means whereby to concurrently apply the brake by both said means, and adjustable means to vary the proportion of the two brake applying forces.

43. A vehicle having, in combination, power driven means, manually operable means, a brake, connections between said brake and each of said means whereby to concurrently apply the brake by both said means, the force exerted by the power driven means being independent of the force exerted by the manual effort applied.

44. A vehicle having, in combination, a brake, a power-operated clutch member, an adjustable spring pressed cooperating clutch member, a connection between said member and the brake, and a second connection for manually operating the brake including a member movable to release said cooperating clutch member to the action of the spring to permit said clutch members to engage one another.

45. A vehicle having, in combination, a brake, means for manually applying the brake, and auxiliary means set in operation by actuation of the manual means and at times operative additionally to apply the brake by power in an amount proportional to the momentum of the vehicle.

46. A vehicle having, in combination, a brake, means for manually applying the brake, auxiliary means set in operation by actuation of the manual means and operative additionally to apply the brake by power in an amount proportional to the momentum of the vehicle, and means for varying the proportion between the momentum of the vehicle and the power applied to the brake.

47. A device of the class described, comprising, in combination, a power driven clutch member, a relatively movable cooperating clutch member, a pair of cooperating wedges, one of which is manually movable to wedge the clutch members together and apart, a disc having diametrically opposite projections, the disc being connected with the second clutch member to turn therewith, the second of said wedges having opposite arms in positions to be engaged by the said projections, the wedge and the projections being arranged to constitute opposed lost motion devices, the one projection imparting rectilinear movement to the wedge when the clutch members turn clockwise and the other projection imparting rectilinear movement to the wedge when the clutch members turn counter clockwise.

48. A vehicle having, in combination, road wheel brakes, a transmission, a friction brake member driven by the transmission, a second co-operating brake member, connections from the second brake member to the brakes including a pair of opposed lost-motion devices one of which is operated when said second member turns clockwise and the other of which is operated when said member turns counter-clockwise, common connections from said devices to the brakes, and driver-controlled means for shifting said second co-operating brake member into frictional engagement with the driven friction brake member to set the brakes.

49. A vehicle having, in combination, brakes, a pair of relatively shiftable co-operating brake and clutch members, one of which is power driven, connections from the other of said brake and clutch members to the brakes including a lever and lost-motion devices operated by the brake and clutch members to rock the lever in the same direction to set the brakes whether the brake or clutch members are turned clockwise or counter-clockwise, and a manually-controlled device for rocking said lever to set the brakes independently of power operation of the brake and clutch members.

50. In a braking system, a rotating member, a second member mounted to be engaged for rotary movement therewith, a third member mounted for rotation, connections between said second member and said third member whereby motion of said second member in either direction imparts uni-directional rotation to said third member, manually operated means for directly operating said third member, and means connecting said third member and the braking system.

51. In a braking system, a rotary member, a second member mounted to be engaged for rotary movement therewith, a plurality of brakes, mechanism including a single part for operating the several brakes and connecting means between the second member and the said single part, whereby rotation of said rotary member, in either direction, is accompanied by such movements of said single part as to apply said brakes, manually operative means to engage said rotary member and said second member and operable also to directly rotate said single part.

52. In a braking system, a rotary member, a second member mounted to be engaged for rotary movement therewith, a plurality of brakes, mechanism including a single part for operating the several brakes and a connection between the second member and the said single part, whereby rotation of said rotary member, in either direction, is accompanied by uni-directional movements of said single part for application of said brakes, manually operated means to affect the engagement of said rotating member and said second member, and also to directly actuate said single part.

53. A braking system comprising a driving member mounted to be driven in both directions of rotation by a transmission shaft, a second member frictionally engageable therewith, manually operable means to affect such an engagement, a third member mounted for rotary movement, mechanism including loose connections between said second member and said third member to effect a uni-directional movement of said third member upon rotation of said rotary driving member in either direction, manually operable means whereby said third member may also be operated directly.

54. Brake operating mechanism for self-propelled vehicles, comprising pedal actuated means for applying the brakes and additional means comprising a servomotor for applying said brakes when the vehicle is in motion, said servomotor comprising a clutch member actuated by said pedal actuated means and a vehicle driven clutch member adapted to be engaged by said first clutch member upon operation thereof by said pedal actuated means, and means connecting said first clutch member to the actuating means for said brakes.

55. In a brake for vehicles or the like, manually operable operating means, friction servo operating means, said manually operable operating means also operating to activate said friction servo means, said last-named means operating with a follow-up action relative to said manually operating means.

56. In a brake for vehicles or the like, manually operable operating means acting to initiate brake application, friction servo power operating means rendered active by said manually operable means to apply the brake subsequent to the initial brake application by the manually operable means.

57. In a brake for vehicles, manually operable operating means acting to initiate brake application, friction servo operating means rendered active by said manually operable means to apply the brake subsequent to the initial application of the brake solely by the manually operable means, said manually operable means being operable concurrently with the friction servo means in brake application after the initial application solely by the manually operable means.

58. A device of the class described comprising, in combination, a power-driven clutch member, a relatively movable cooperating clutch member, a pair of cooperating wedges, one of which is manually movable to wedge the clutch members together and apart, a disk having diametrically opposite projections, the disk being connected to the second clutch member to turn therewith, and a slidably-mounted yoke having opposite arms in positions to be engaged by the projections, the yoke and projections being arranged to constitute opposed lost-motion devices, the one projection imparting rectilinear movement to the yoke when the clutch members turn clockwise and the other projection imparting rectilinear movement to the yoke when the clutch members turn counter-clockwise.

59. A vehicle transmission comprising, in combination, a power-driven shaft, a clutch member geared thereto, a cooperating clutch member, a brake-operating member connected to said second clutch member, a spring urging the clutch members apart, and a manually-movable wedge arranged to force the clutch members together against the resistance of the spring.

60. A vehicle having, in combination, a brake, a transmission including a power-driven shaft, a clutch member mounted on the transmission and geared to the shaft, a cooperating clutch member connected to the brake and arranged to operate it whichever way the member turns, a manually-movable controlling member, a wedge arranged to force the clutch members together progressively harder as the controlling member is moved, and connections from the controlling member for manually operating the brake.

61. A vehicle having, in combination, a brake, a power-driven shaft, a clutch member geared to the shaft, a cooperating clutch member connected to the brake and arranged to operate it, a manually-movable controlling member, and a wedge arranged to force the clutch members together progressively harder as the controlling member is moved.

In testimony whereof I affix my signature.
LLOYD BLACKMORE.